(12) United States Patent
Butler, Jr.

(10) Patent No.: US 10,588,343 B2
(45) Date of Patent: Mar. 17, 2020

(54) HOOKAH TABLE

(71) Applicant: Dennis Ramon Butler, Jr., Atlanta, GA (US)

(72) Inventor: Dennis Ramon Butler, Jr., Atlanta, GA (US)

(*) Notice: Subject to any disclaimer, the term of this patent is extended or adjusted under 35 U.S.C. 154(b) by 300 days.

(21) Appl. No.: 15/865,223

(22) Filed: Jan. 8, 2018

(65) Prior Publication Data

US 2018/0192694 A1    Jul. 12, 2018

Related U.S. Application Data

(60) Provisional application No. 62/443,444, filed on Jan. 6, 2017.

(51) Int. Cl.
| | |
|---|---|
| *A24F 1/30* | (2006.01) |
| *A24F 3/00* | (2006.01) |
| *A47B 37/00* | (2006.01) |
| *A24F 47/00* | (2020.01) |
| *H02J 7/00* | (2006.01) |
| *H05B 1/02* | (2006.01) |
| *A47B 31/02* | (2006.01) |

(52) U.S. Cl.
CPC .............. *A24F 3/00* (2013.01); *A24F 1/30* (2013.01); *A24F 47/008* (2013.01); *A47B 31/02* (2013.01); *A47B 37/00* (2013.01); *H02J 7/0027* (2013.01); *H02J 7/0042* (2013.01); *H05B 1/0252* (2013.01); *A47B 2200/0009* (2013.01); *A47B 2200/0078* (2013.01); *A47B 2220/0077* (2013.01)

(58) Field of Classification Search
None
See application file for complete search history.

(56) References Cited

PUBLICATIONS

Dugdale, Addy, "Hookah Table Not What I Sounds Like, Thank Gawd", gizmodo.com, https://gizmodo.com/hookah-table-not-what-it-sounds-like-thank-gawd-376481 (Year: 2008).*
HookahTownUSA, "New E-Coal Hookah Bowl Electronic Hookah Coal: How to", HookahTown.com, https://youtu.be/G4XoOJBJdlk (Year: 2014).*

* cited by examiner

*Primary Examiner* — Michael J Felton

(57) ABSTRACT

A hookah table is a table designed to increase the safety around socially smoking hookah. The hookah table includes a table, at least one hookah apparatus, a control panel, a central processing unit (CPU), and at least one heating element. The at least one hookah apparatus is mounted to a table base of the table. The control panel inputs control signals that are processed by the CPU to control the at least one heating element to vaporize intrinsic compounds within a smokable substance. The user inhales the vapor from the smokable substance through the at least one hookah apparatus. The control panel is externally integrated into a table top of the table, opposite to the table base. The CPU is internally mounted to the table top. The at least one heating element is selectively mounted to a corresponding hookah apparatus to heat the smokable substance.

20 Claims, 12 Drawing Sheets

US 10,588,343 B2

HOOKAH TABLE

The current application claims a priority to the U.S. Provisional Patent application Ser. No. 62/443,444 filed on Jan. 6, 2017.

FIELD OF THE INVENTION

The present invention relates generally to an electronic hookah smoking apparatus integrated into a table. More particularly, the present invention relates to a hookah apparatus that removes the need for burning coals to be used when roasting smokable substances. A user of the present invention will be able to utilize an electrically controlled heating element to achieve the optimal heating for the smokable substance.

BACKGROUND OF THE INVENTION

The hookah table is a modern design for a table with an integrated or mounted hookah apparatus for convenient use in bars, lounges, and clubs. Traditionally in hookah lounges, a server transports hot coals to a patron's hookah apparatus at the patron's table in the lounge. As the server transports a tray of hot coals through the establishment to patrons' tables, unfortunate circumstances may occur where the server could lose control of the coals injuring a patron or damaging the establishment. With electric heating elements, the danger of transporting hot coals is eliminated.

The present invention is a hookah table that modernizes the smoking process with a hookah apparatus by implementing an electric heating element to heat smokable substances and promotes a social atmosphere. The present invention receives a capsule of the smokable substance to increase the convenience of the present invention, allowing the users to quickly interchange the smokable substance with another smokable substance with a different flavor or vaporization temperature. The heating element is controlled by the user through a control panel integrated into a table top to adjust how the smokable substance is heated. The table provides a surface that people can gather around and socially engage with one another while smoking with the hookah apparatus. The present invention brings elegance, convenience, and style to any bar or lounge that involves smoking hookah.

DETAIL DESCRIPTIONS OF THE INVENTION

Figure 1:
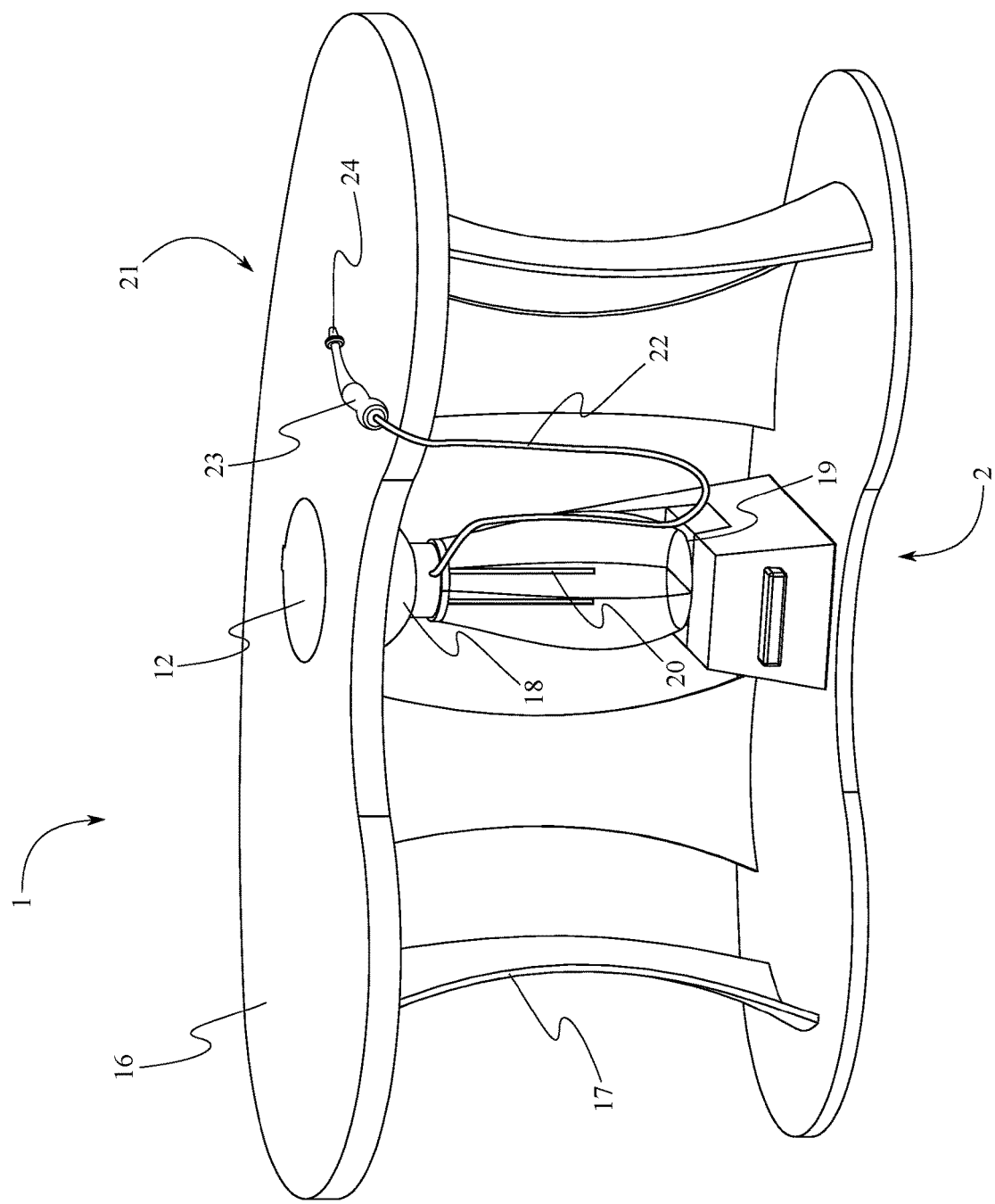
FIG. 1 is a perspective view of the present invention, wherein the panel cover is in a closed position.

All illustrations of the drawings are for the purpose of describing selected versions of the present invention and are not intended to limit the scope of the present invention.

The present invention is a hookah table. The present invention integrates a hookah apparatus with a lounge table to promote a social atmosphere while smoking using the hookah apparatus. The hookah apparatus receives smokable substances, including but not limited to, shisha, dry herbs, vaporization juice, or wax substances. These smokable substances are heated in order to vaporize intrinsic compounds of the smokable substance. This vapor is then filtered through water before a user inhales the vapor to receive the euphoric effect from the inhalation.

The present invention comprises a table 1, at least one hookah apparatus 2, a control panel 3, a central processing unit (CPU) 4, and at least one heating element 5. The table 1 provides a supported surface for users to gather around for social engagement. The table 1 comprises a table top 16 and a table base 17. The table top 16 allows for the support of beverages, food, and personal effects. The table base 17 supports the weight of the table top 16 and any objects resting on the table top 16. The table top 16 is adjacently connected to the table base 17. The at least one hookah apparatus 2 is a vessel that supports the smokable substance to be heated, vaporizing intrinsic compounds, which are then filtered and cooled through water to be inhaled by the user. The at least one hookah apparatus 2 is mounted to the table base 17. In some embodiments of the present invention, the at least one hookah apparatus 2 is a plurality of hookah apparatuses, the plurality of hookah apparatuses allows users to heat a plurality of smokable substances simultaneously. The control panel 3 allows the user to toggle the at least one heating element 5 on or off, adjust the thermal output from the at least one heating element 5, control the duration of the thermal output, or execute establishment specific functions, such as calling a server, placing an order, or paying a bill. The control panel 3 is externally integrated into the table top 16, opposite to the table base 17, to provide easy access to the users. In some embodiments of the present invention, the control panel 3 is waterproof in order to protect the control panel 3 and the associated electrical circuit from damage or shorting out due to beverages spilled on the table top 16.

Figure 8:
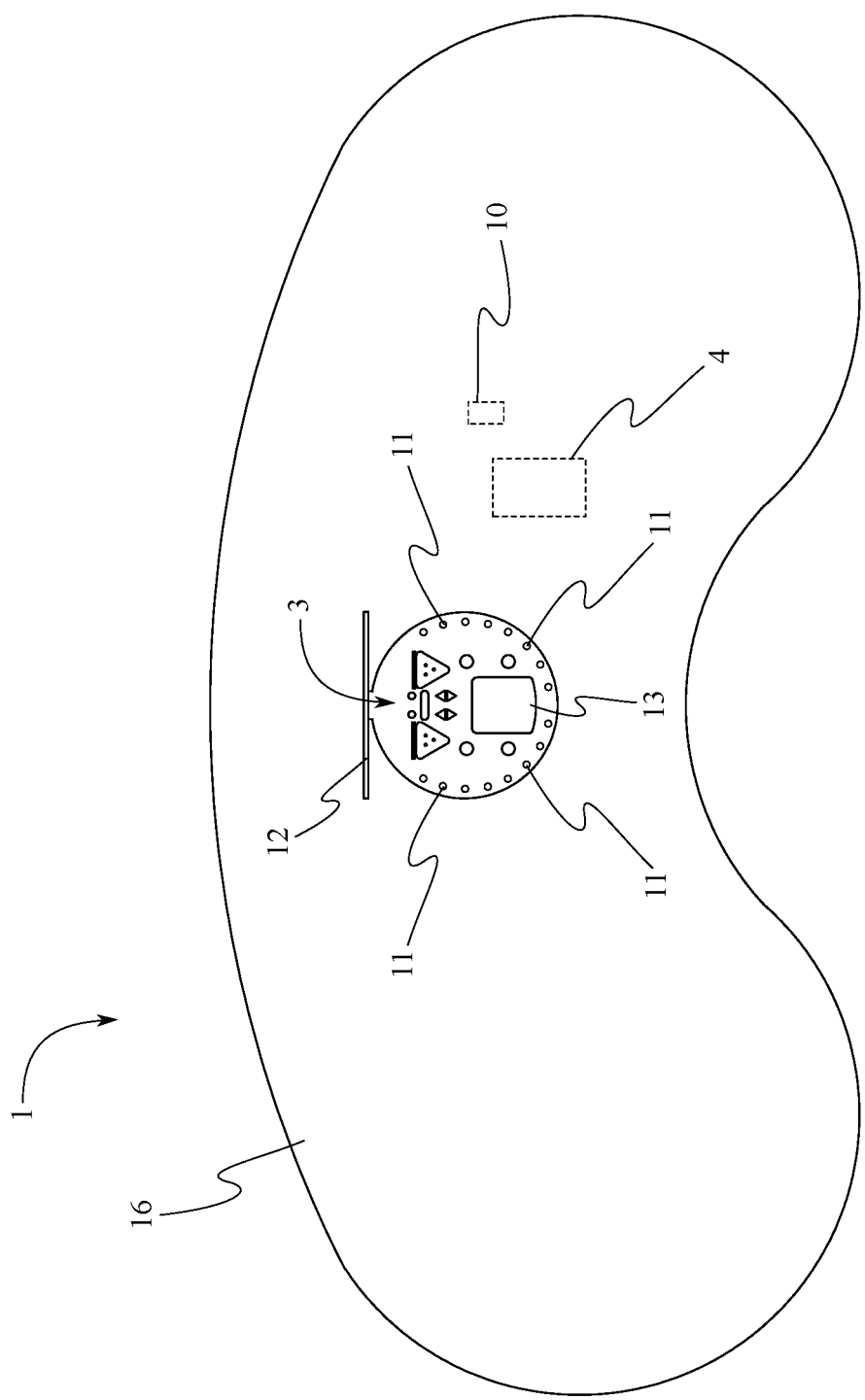
FIG. 8 is a top plan view of the present invention showing the central processing unit and the wireless transceiver mounted within the table top and, wherein the panel display device is integrated into the control panel.

The CPU 4 processes signals from the control panel 3 to distribute the proper action to connected peripheral devices. The CPU 4 receives electricity from an external power source or from a battery and distributes the electrical power to attached peripherals. The CPU 4 is internally mounted to the table top 16 as depicted in FIG. 8. In reference to FIG.

Figure 10:
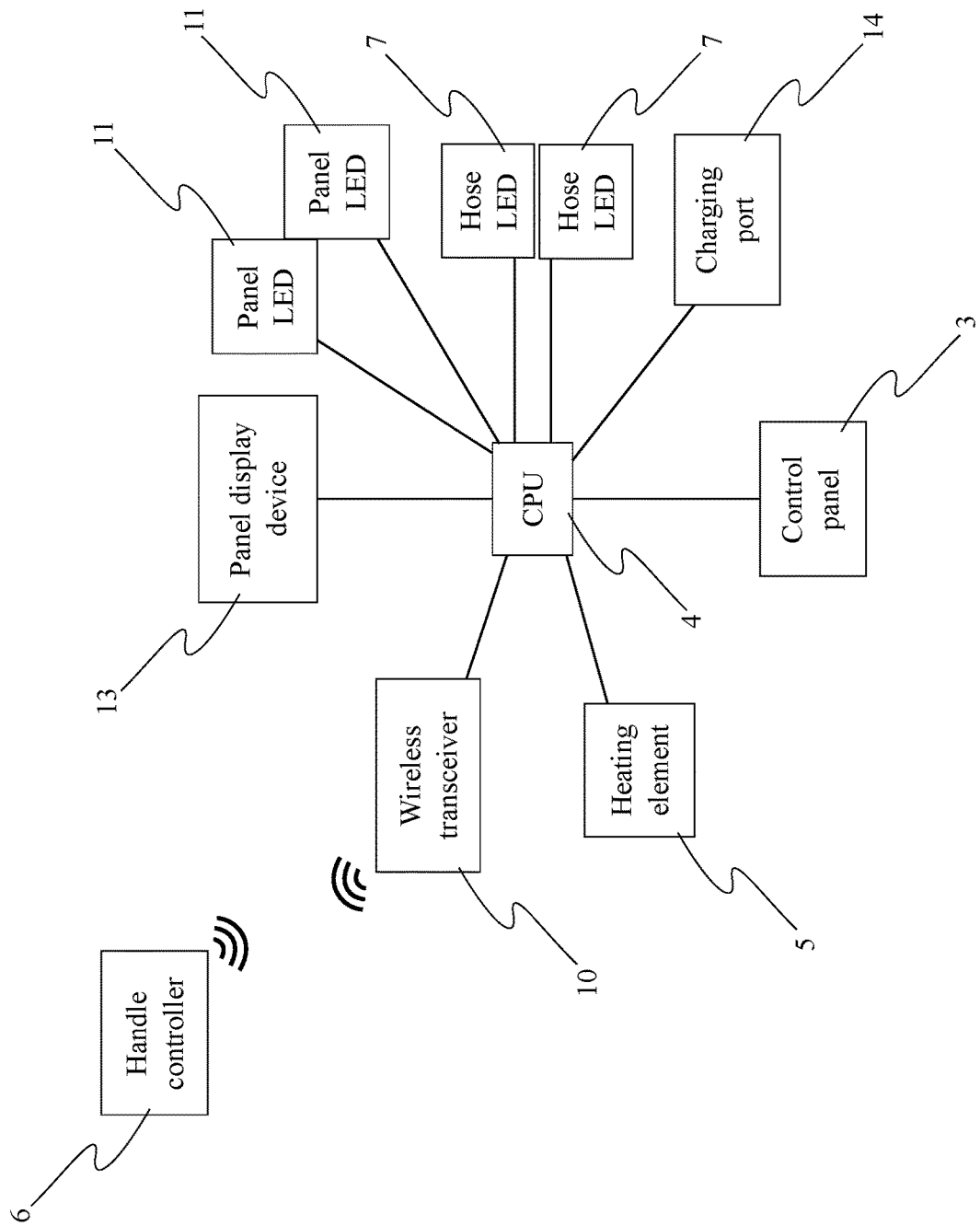
FIG. 10 is a diagram depicting the electrical connections between the central processing unit and the other components, and the wireless connection of the handle controller to the central processing unit through the wireless transceiver.

10, the control panel 3 is electronically connected to the CPU 4 to translate user inputs into the proper response by the connected peripherals. The at least one heating element 5 outputs thermal energy to heat the smokable substance to vaporize intrinsic compounds of the smokable substance for the user to inhale. The at least one heating element 5 is selectively mounted adjacent to a corresponding hookah apparatus of the at least one hookah apparatus 2, in order to output thermal energy towards the smokable substance supported by the at least one hookah apparatus 2 to heat the smokable substance and vaporize the intrinsic compounds. The at least one heating element 5 is electrically connected to the CPU 4, as depicted in FIG. 10, wherein the at least one heating element 5 translates electrical energy into thermal energy. The at least one heating element 5 reduces the possibility of injury or incident by eliminating the need for a flame or hot coal to heat the smokable substance.

More specific to the preferred embodiment of present invention and in reference to FIG. 1, each hookah apparatus of the at least one hookah apparatus 2 comprises a substance support 18, a water reservoir 19, a smoke-receiving stem 20, and at least one hookah hose 21. The substance support 18 supports the smokable substance while the smokable substance is heated. The substance support 18 is preferred to be ceramic, glass, metal, or any other appropriate material that is resistant to deformation and damage from the high temperatures required to vaporize the intrinsic compounds of the smokable substance. The substance support 18 is adjacently connected to the water reservoir 19. The water reservoir 19 houses a quantity of water for the intrinsic compound vapor to be filtered and cooled through. The water reservoir 19 is mounted onto the table base 17. The substance support 18 is positioned adjacent to the table top 16. The smoke-receiving stem 20 channels the vapor from heating the smokable substance through the substance support 18 and into the water reservoir 19. The smoke-receiving stem 20 is in fluid communication with the substance support 18. The smoke-receiving stem 20 is positioned within the water reservoir 19. The substance support 18 is in fluid communication with the water reservoir 19 through the smoke-receiving stem 20. A stem end of the smoke-receiving stem 20, opposite to the substance support 18, is submerged into water within the water reservoir 19 during implementation to filter the vapor stream through the water as the user inhales on the at least one hookah hose 21. The at least one hookah hose 21 is one or more flexible conduits that the user draws the vapor through by inhaling. In some embodiments of the present invention, the at least one hookah hose 21 is a plurality of hookah hoses in order to allow a corresponding number of users to imbibe the same smokable substance simultaneously. The at least one hookah hose 21 is adjacently and externally connected to the water reservoir 19. The at least one hookah hose 21 is positioned between the table base 17 and the substance support 18. The at least one hookah hose 21 is positioned on the water reservoir 19 such that the at least one hookah hose 21 is offset from a maximum fill height for water within the water reservoir 19 to prevent the user from inhaling the water, during implementation of the present invention. The at least one hookah hose 21 is in fluid communication with the smoke-receiving stem 20 through the water reservoir 19 to allow the vapor to flow through the water and into the at least one hookah hose 21 as the user inhales on the at least one hookah hose 21.

Figure 9:
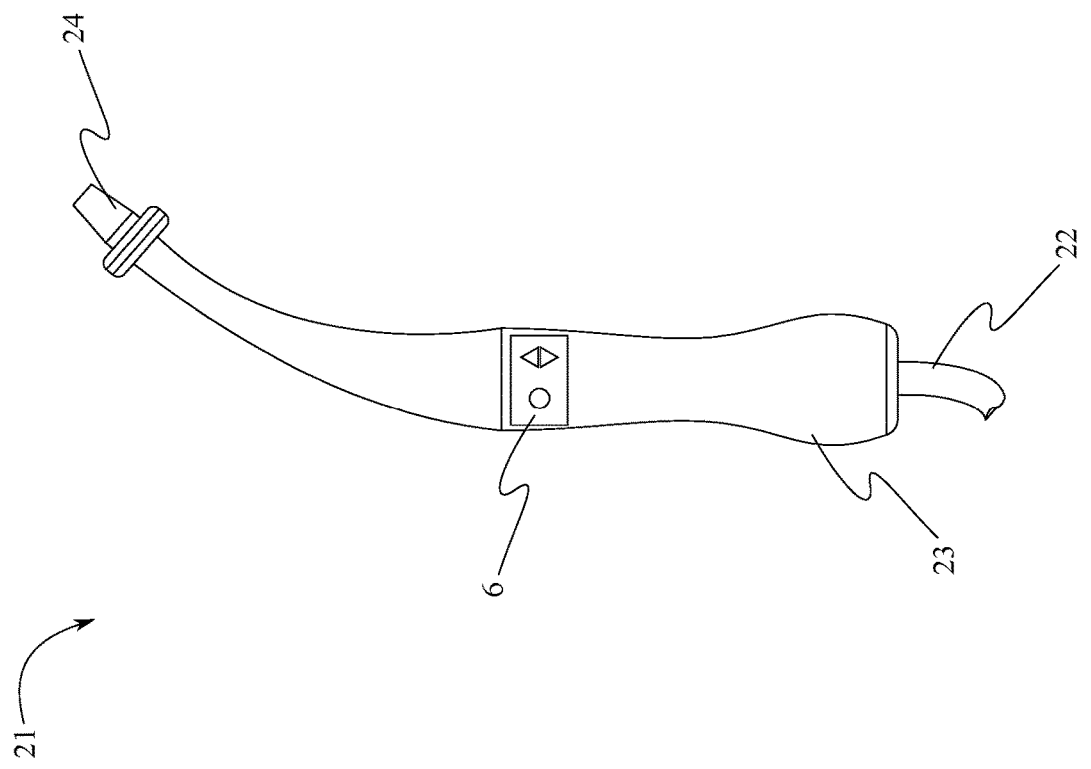
FIG. 9 is a top plan view of the hookah hose, wherein the handle controller is integrated into the hose handle.

Further in accordance to the preferred embodiment of the present invention and in reference to FIG. 1 and FIG. 9, each hookah hose of the at least one hookah hose 21 comprises a smoke conduit 22, a hose handle 23, and a mouthpiece 24. The smoke conduit 22 is the flexible conduit that smoke flows through from the water reservoir 19. The smoke conduit 22 is adjacently and externally connected to the water reservoir 19. The hose handle 23 allows the user to comfortably manipulate the at least one hookah hose 21 to pass the at least one hookah hose 21 to another user or to secure the hookah handle during storage. The mouthpiece 24 allows the user to comfortably position the user's lips around to inhale vapor generated from the smokable substance. The mouthpiece 24 is terminally connected to the smoke conduit 22, opposite to the water reservoir 19. The hose handle 23 is adjacently connected around the smoke conduit 22 and is adjacently positioned to the mouthpiece 24. The mouthpiece 24 is in fluid communication with water reservoir 19 through the smoke conduit 22 to allow the user to inhale the vapor.

In reference to FIG. 9, in some embodiments of the present invention, the present invention further comprises a handle controller 6. The handle controller 6 allows the user to have similar functionality to the control panel 3 to toggle the at least one heating element 5 on or off, adjust the thermal output from the at least one heating element 5, or control the duration of the thermal output. The handle controller 6 is integrated into the hose handle 23. The handle controller 6 is communicatively coupled with the CPU 4, as depicted in FIG. 10, in order to transmit the control signals to the appropriate peripherals. The handle controller 6 is either wirelessly connected, using Bluetooth, Wi-Fi, or radiofrequency, or hardwired along the smoke conduit 22 to the CPU 4 to communicate the control signals.

Figure 3:
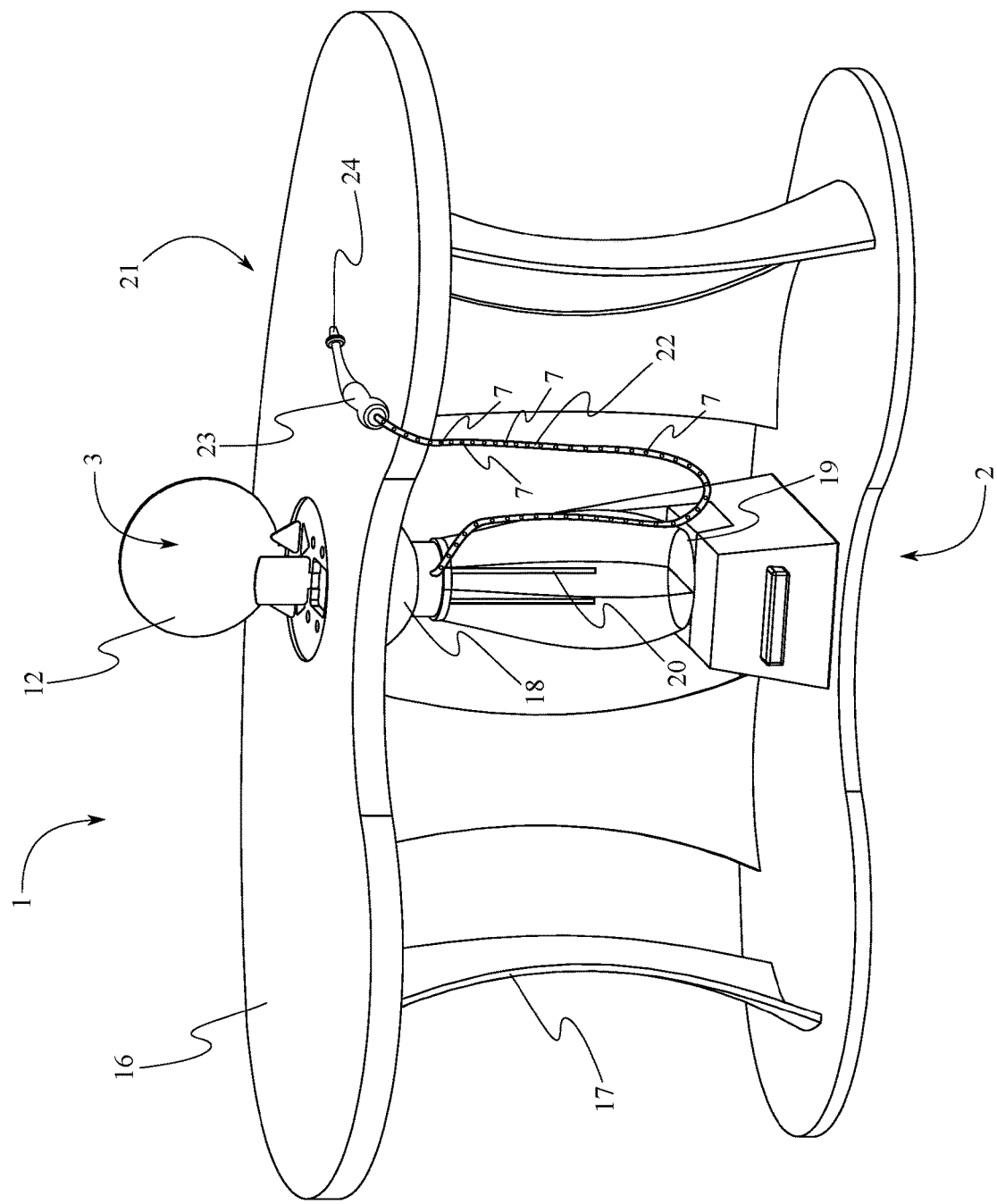
FIG. 3 is a perspective view of the present invention, wherein the plurality of hose light emitting diodes is integrated along the smoke conduit.

In reference to FIG. 3, in some other embodiments of the present invention, the present invention comprises a plurality of hose light emitting diodes (LEDs) 7. The plurality of hose LEDs 7 indicate that the smokable substance is heating or properly heated to vaporize the intrinsic compounds of the smokable substance. The plurality of hose LEDs 7 are integrated along each hookah hose. As the smokable substance is heated, the plurality of hose LEDs 7 sequentially activate along the hookah hose from the water reservoir 19 until the substance is completely heated at a terminal hose LED of the plurality of hose LEDs 7. The plurality of hose LEDs 7 are electrically connected to the CPU 4, as depicted in FIG. 10, such that as the at least one heating element 5 is activated, the corresponding plurality of hose LEDs 7 indicate the heating progress.

Figure 4:
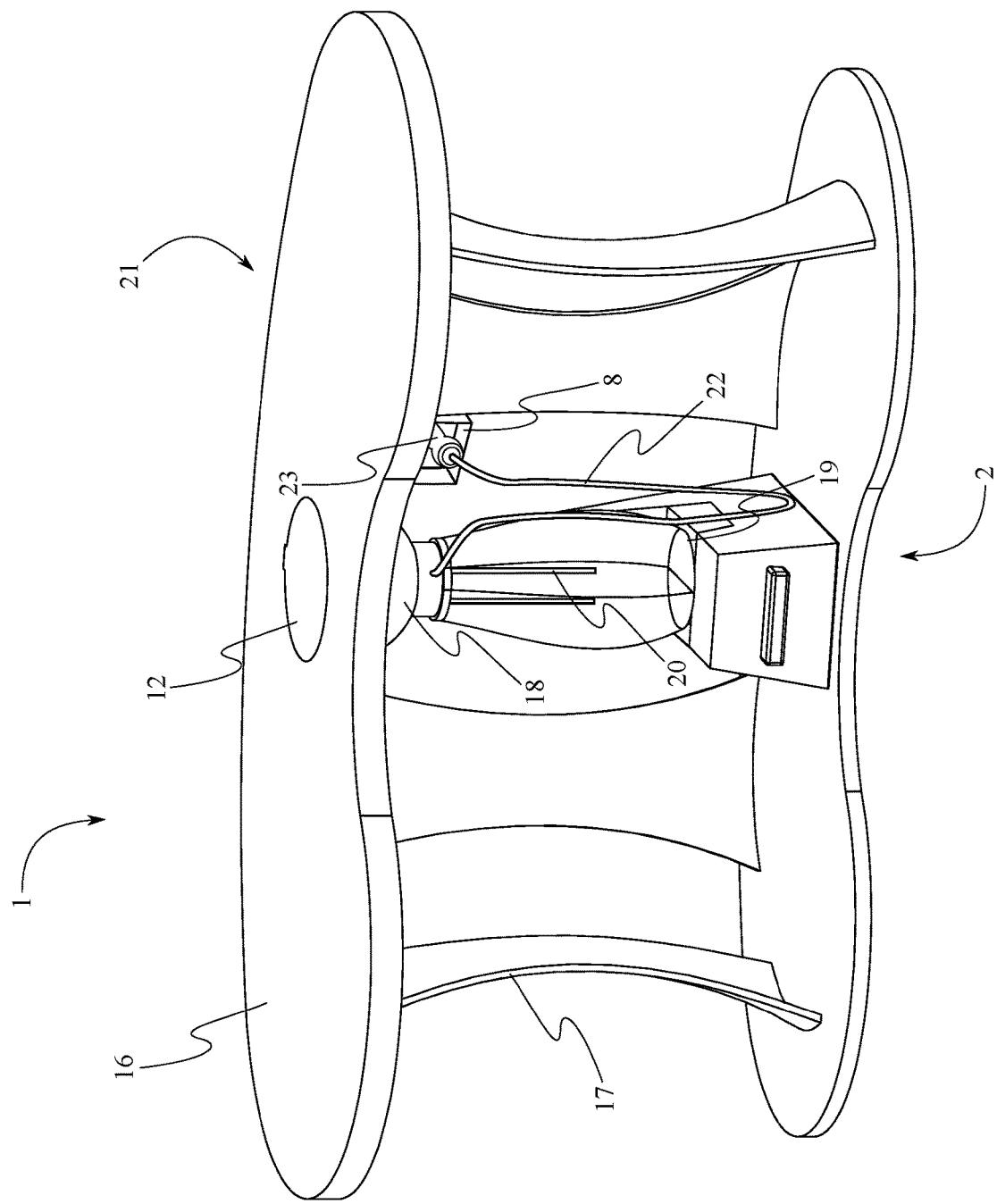
FIG. 4 is a perspective view of the present invention, wherein the hose handle is stored in the corresponding handle holder.

In reference to FIG. 4, the preferred embodiment of the present invention further comprises at least one handle holster 8. The at least one handle holster 8 allows for the storage of the at least one hookah hose 21 when the present invention is not in use. The at least one handle holster 8 is adjacently connected to the table top 16 to allow users to efficiently access the at least one hookah hose 21. The at least one handle holster 8 is positioned opposite to the control panel 3 about the table top 16 in order to prevent the at least one handle holster 8 from limiting the accessible surface area of the table top 16 for food, beverage, or personal effects. To store the at least one hookah hose 21, each hose handle 23 is positioned within a corresponding handle holster of the at least one handle holster 8.

Figure 11:
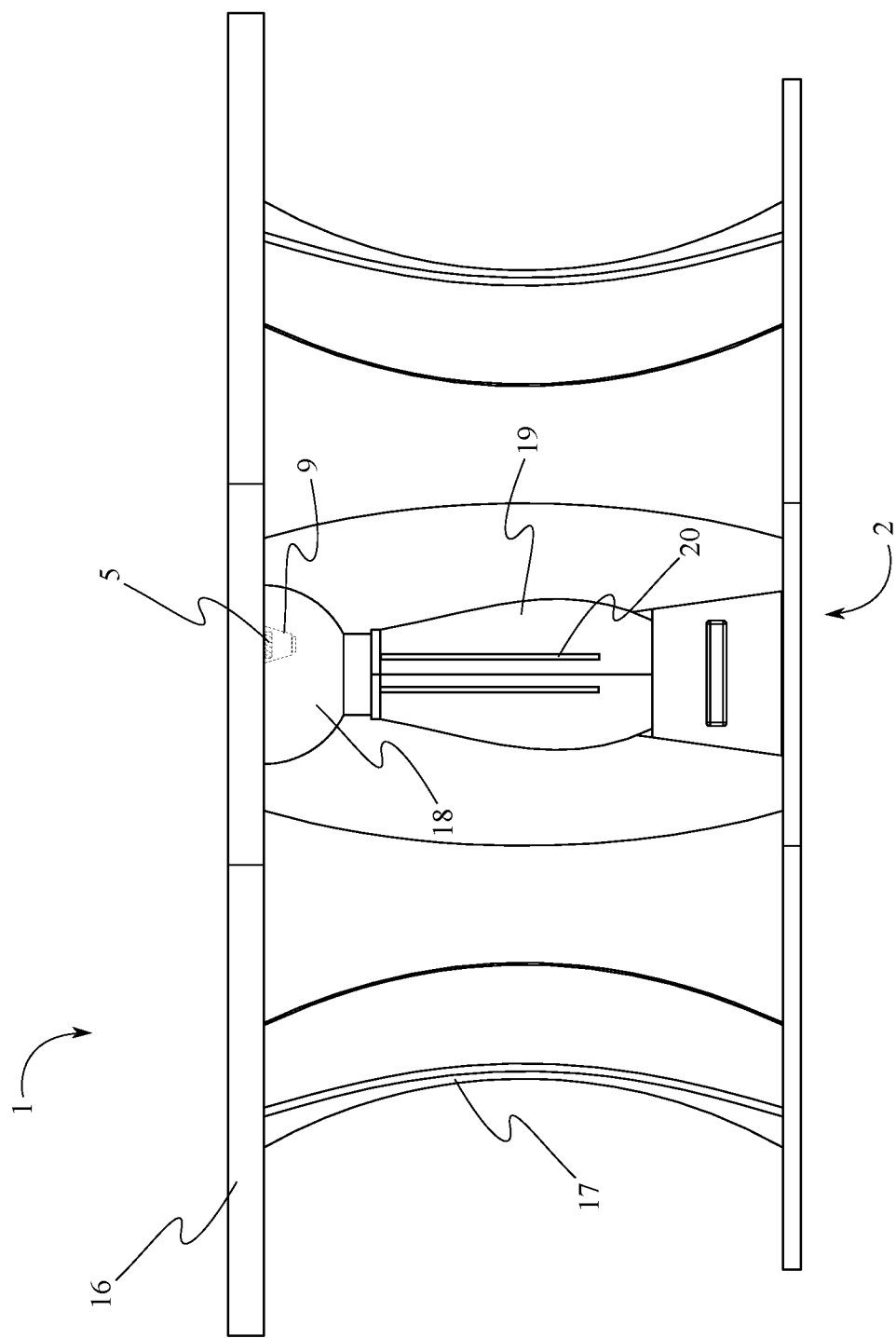
FIG. 11 is a front elevational view of the present invention, showing the substance capsule positioned into the substance support.

As mentioned, the present invention is intended to be implemented in a bar or lounge setting. Therefore, the user is able to select between a plurality of flavors for the smokable substance. The smokable substance is then prepared and placed into a substance capsule 9. The substance capsule 9 allows the smokable substance to be quickly interchanged with another substance. The substance capsule 9 is selectively mounted to the at least one hookah apparatus 2 to secure the substance capsule 9. More specifically, the substance capsule 9 is positioned into the substance support 18 as depicted in FIG. 11. The substance capsule 9 is in fluid communication with the substance support 18 to allow the vapor from heating the smokable substance to be inhaled through the at least one hookah apparatus 2. The substance capsule 9 is also in fluid communication with the atmosphere, to allow air to flow over the smokable substance, preventing a vacuum from being generated within substance capsule 9.

Figure 12:
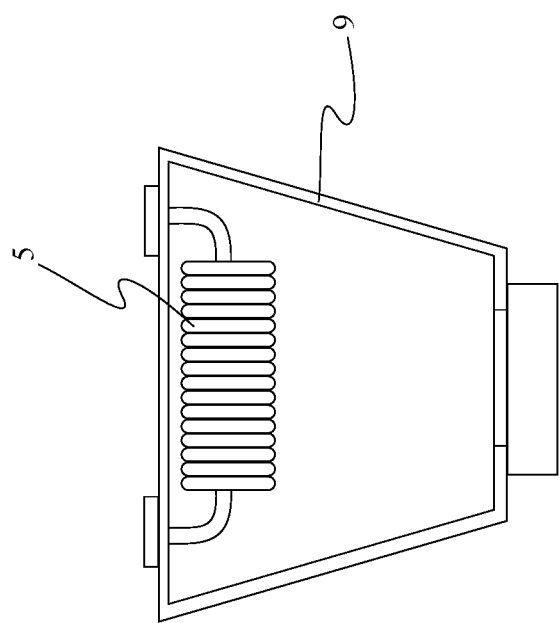
FIG. 12 is a sectional view of the substance capsule, showing the internally mounted heating element.

In reference to FIG. 12, for a more specific embodiment of the present invention, the at least one heating element 5 is internally mounted to the substance capsule 9. In this embodiment, the at least one heating element 5 is mounted to the table base 17 through the substance capsule 9 to directly heat the smokable substance. The at least one heating element 5 is electrically connected to the CPU 4 through the substance capsule 9 to power the at least one heating element 5.

In still some other embodiments of the present invention, the present invention comprises a wireless transceiver 10, as depicted in FIG. 8. The wireless transceiver 10 allows the CPU 4 to receive and transmit remote signals, for instance transmitting a payment signal to pay a tab remotely, transmitting an alert to a server for placing an order or reporting an issue, and receiving control signals from the handle controller 6 to manipulate the at least one heating element 5. The wireless transceiver 10 is internally mounted to the table top 16 to prevent the wireless transceiver 10 from receiving damage or from tampering. The wireless transceiver 10 is electronically connected to the CPU 4 as depicted in FIG. 10, such that the CPU 4 is able to process input and output signals from the wireless transceiver 10.

In reference to FIG. 8, further in accordance to the preferred embodiment of the present invention, the present invention comprises a plurality of panel LEDs 11. The plurality of panel LEDs 11 indicate if a corresponding heating element of the at least one heating element 5 is active. The plurality of panel LEDs 11 is integrated into the table top 16. The plurality of panel LEDs 11 is positioned around the control panel 3 to indicate if a corresponding heating element of the at least one heating element 5 is active. The plurality of panel LEDs 11 is electrically connected to the CPU 4 to receive power to selectively illuminate the plurality of panel LEDs 11.

Figure 2:
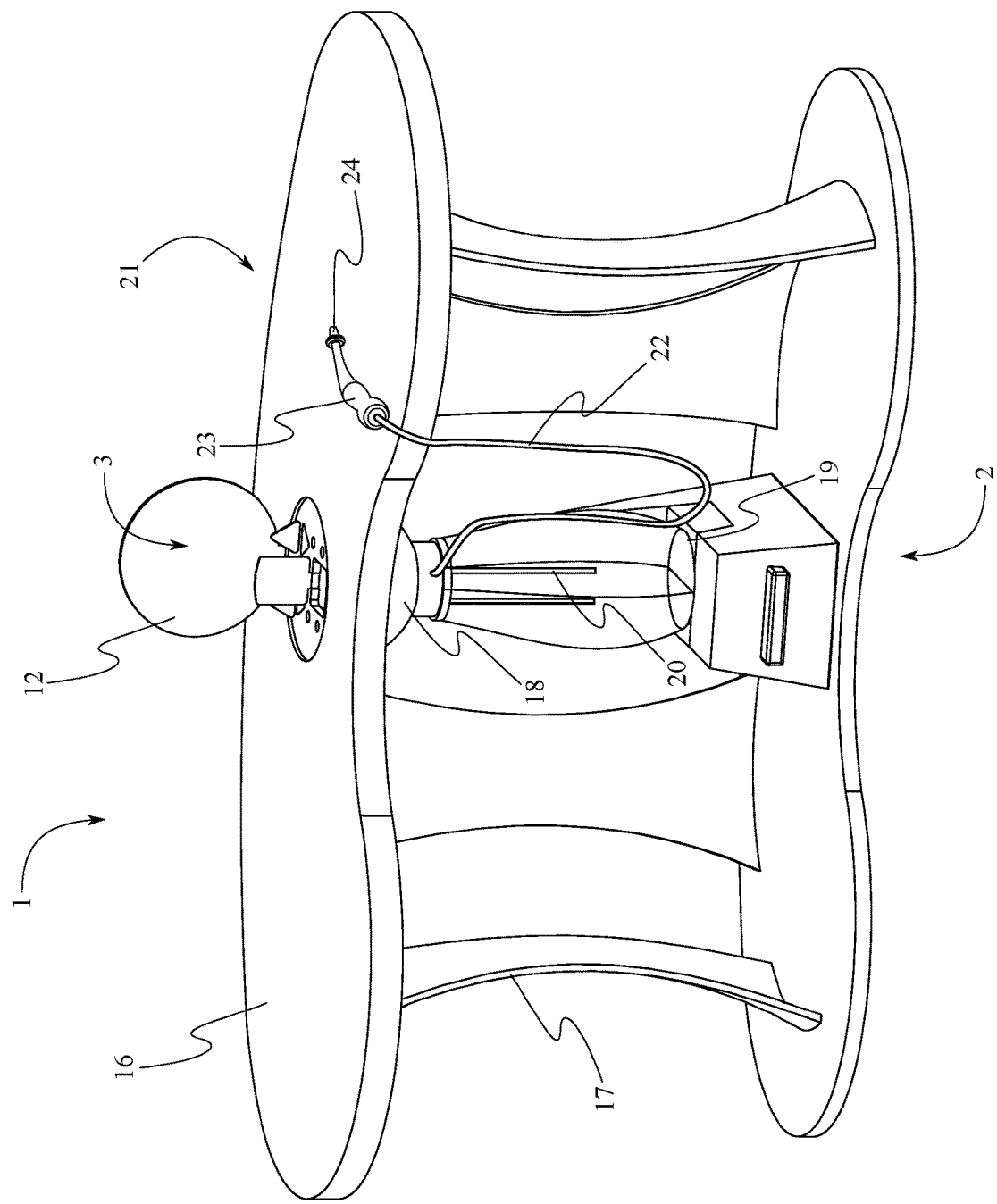
FIG. 2 is a perspective view of the present invention, wherein the panel cover is in an open position.

In an alternate embodiment of the present invention, the present invention comprises a panel cover 12. The panel cover 12 protects the control panel 3 from dust, debris, or incidental contact. The panel cover 12 is hingedly connected to the table top 16, adjacent to the control panel 3, as depicted through FIG. 1-2. To cover the control panel 3, the control panel 3 is positioned between the panel cover 12 and the table top 16 by rotating the panel cover 12.

Figure 6:
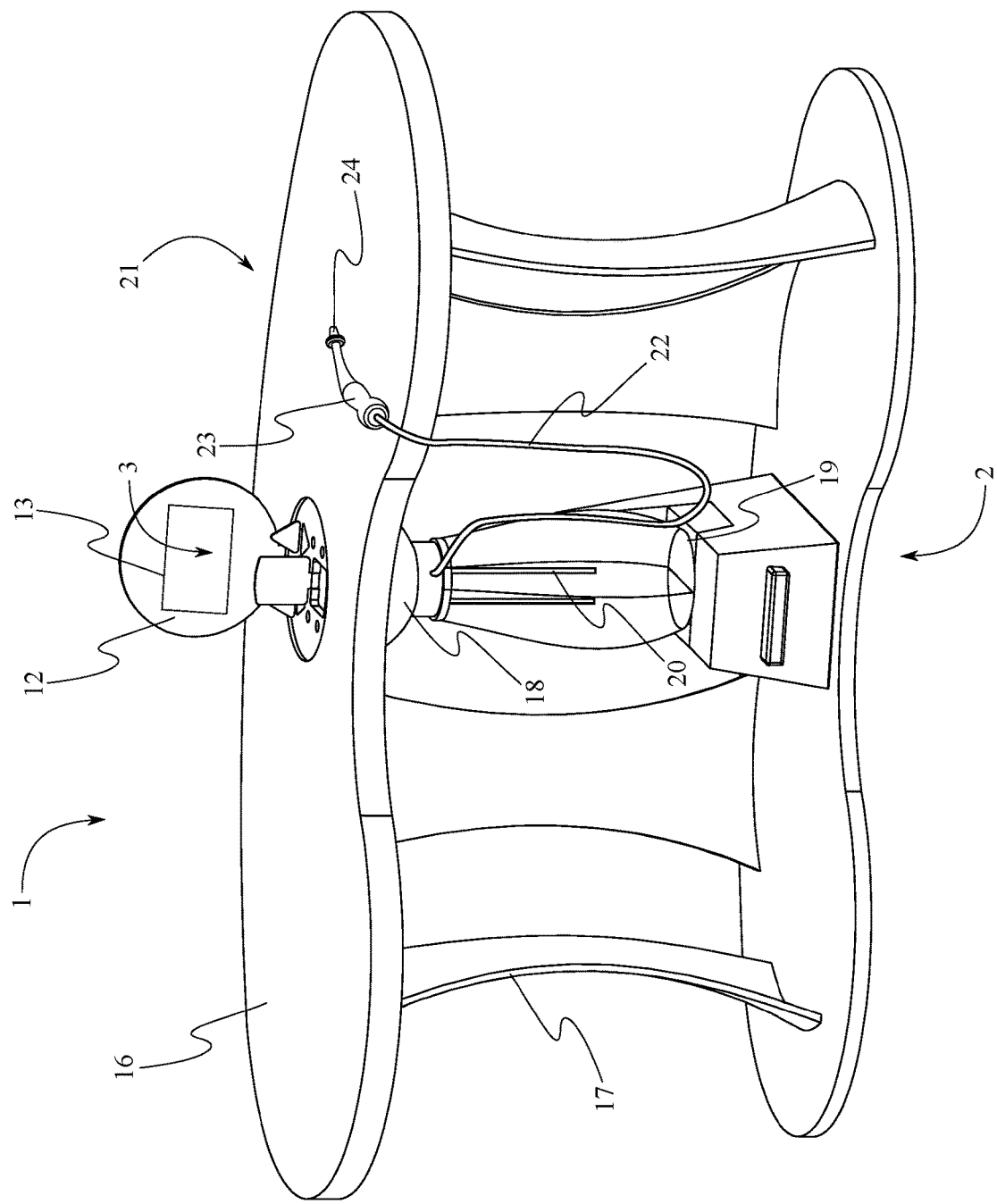
FIG. 6 is a perspective view of the present invention, wherein the panel display device is integrated into the panel cover.

For a more specific alternate embodiment, the present invention comprises a panel display device 13. The panel display device 13 displays videos, digital images, trivia, games, establishment information, such as menu items, or operational information, such as the operating temperature for the at least one heating element 5, to the user. In reference to FIG. 6, the panel display device 13 is integrated into the panel cover 12. The panel display device 13 is positioned between the panel cover 12 and the control panel 3 to protect the panel display device 13 while the panel cover 12 is covering the control panel 3, as well as, allowing the user to adjust the viewing angle of the panel display device 13 per the user's viewing preference or to reduce glare. The panel display device 13 is electronically coupled with the CPU 4, as depicted in FIG. 10, to receive display output signals that the user is to able to select options from and view operating temperatures for the at least one heating element 5.

In still other embodiments of the present invention and in reference to FIG. 8, the panel display device 13 is externally integrated with the control panel 3. This configuration is able to be implemented in embodiments for the present invention that do not include the panel cover 12. The panel display device 13 is similarly electronically coupled with the CPU 4 to receive display output signals that the user is to able to select options from and view operating temperatures for the at least one heating element 5. For these embodiments of the present invention, the control panel 3 is preferred to be a touchscreen display device, as the panel display device 13 is integrated into the control panel 3. Using the touchscreen display device, the user can simultaneously view and manipulate settings for the at least one heating element 5 and other functionalities of the present invention.

Figure 7:
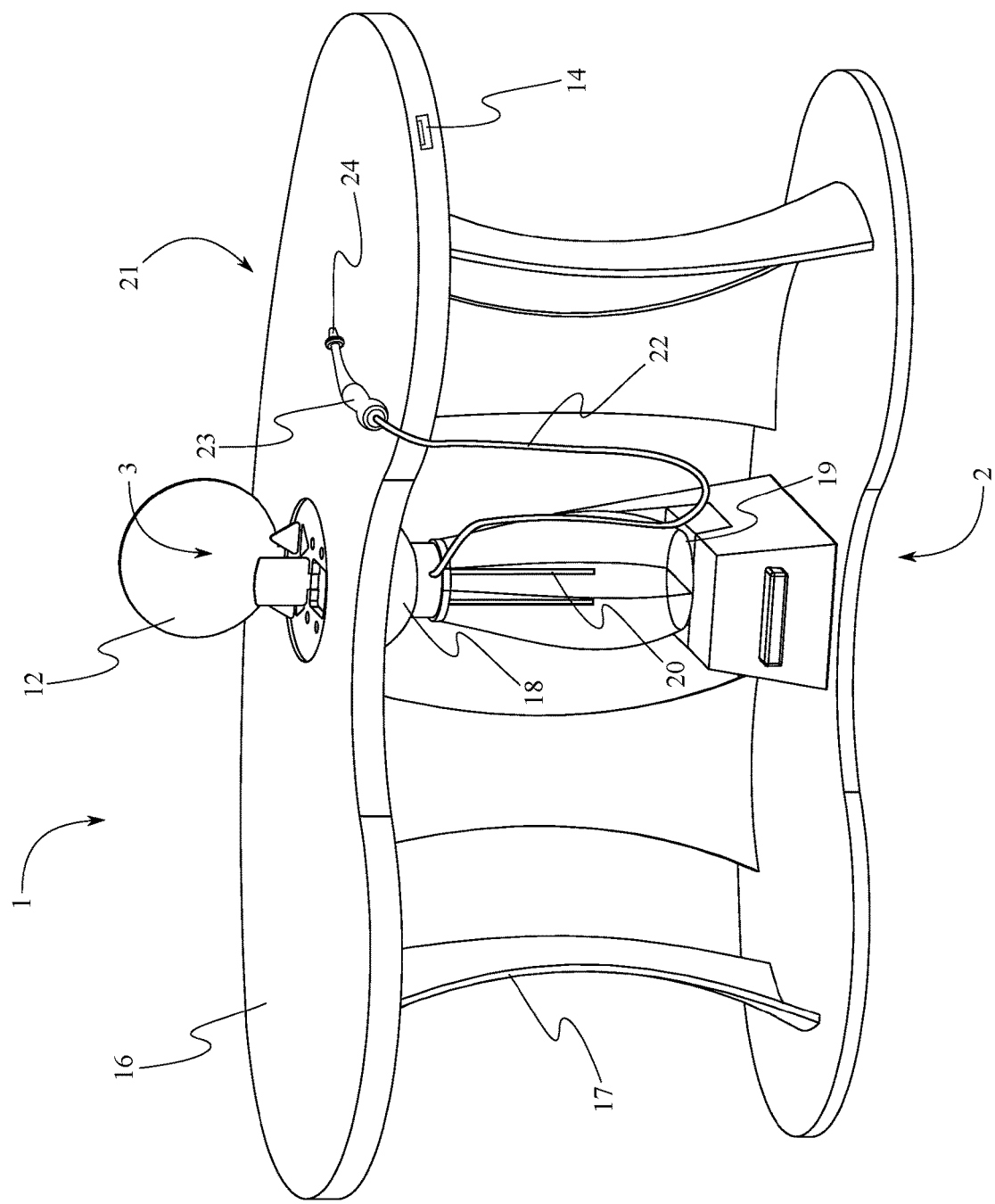
FIG. 7 is a perspective view of the present invention, wherein the mobile device charging port is integrated into the table top.

As previously mentioned the present invention is a focus for a social gathering, users will spend an extended period around the present invention. User may engage in sharing videos, photos, and other media through a mobile device. If a user uses the mobile phone excessively, the battery will discharge to a potentially inoperable level. Therefore, some embodiments of the present invention further comprise a mobile device charging port 14. The mobile device charging port 14 allows the user to recharge the mobile device to maintain an operable level of charge. In reference to FIG. 7, the mobile device charging port 14 is externally integrated into the table top 16, such that the mobile device charging port 14 is accessible to the user. The mobile device charging port 14 is electrically connected to the CPU 4 to distribute power to the mobile device when the mobile device is coupled with the mobile device charging port 14.

Figure 5:
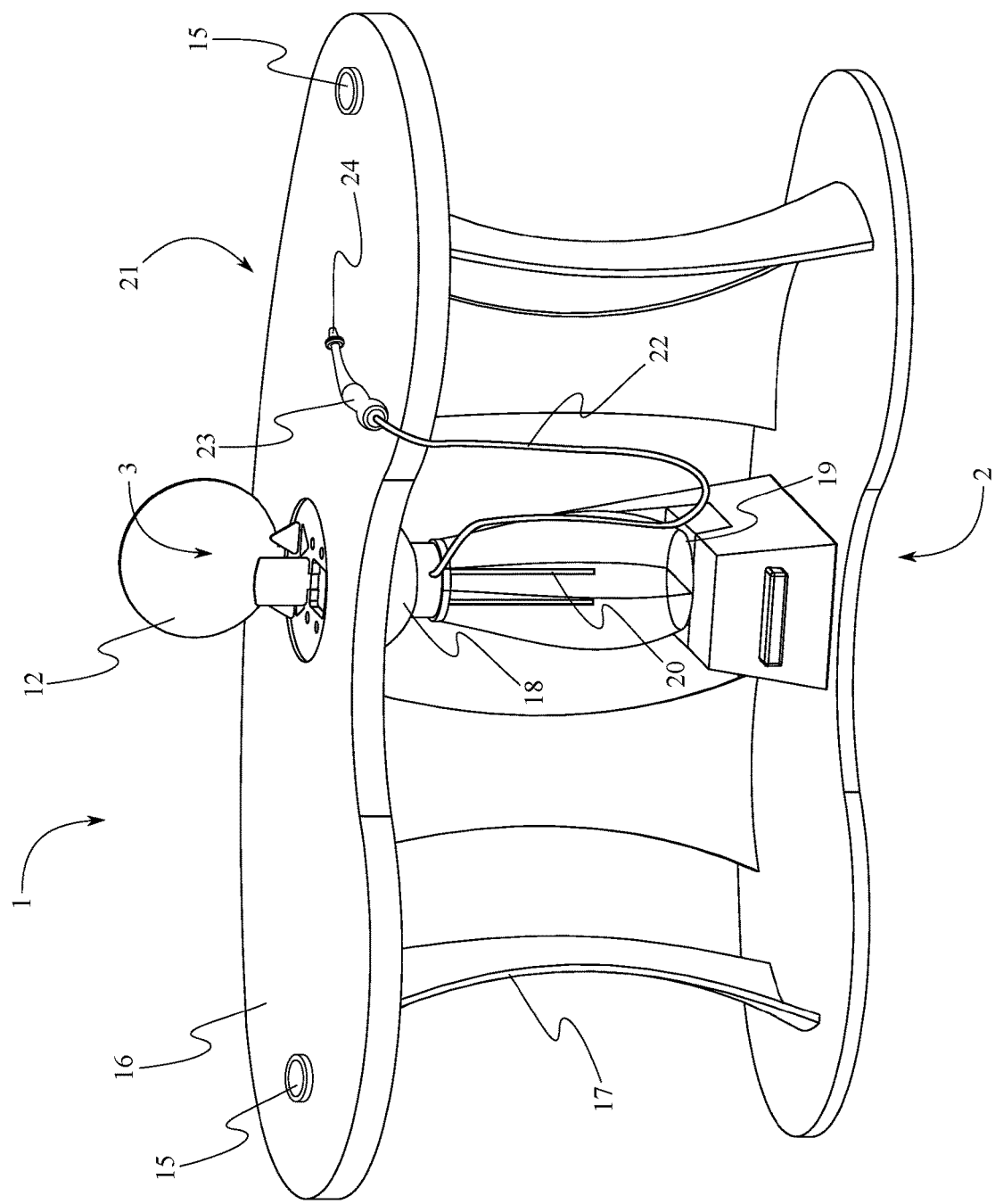
FIG. 5 is a perspective view of the present invention, wherein the plurality of coaster pads is integrated into the table top.

In reference to FIG. 5, in still other embodiments of the present invention, the present invention comprises a plurality of coaster pads 15. The plurality of coaster pads 15 increase the coefficient of friction for beverage containers placed on the plurality of coaster pads 15 to prevent the beverage containers from sliding across the table top 16. Therefore, the chance of the contents for the beverage container from spilling onto the table top 16 is reduced. The plurality of coaster pads 15 is adjacently connected to the table top 16. The plurality of coaster pads 15 is oppositely positioned to the table base 17, about the table top 16, to allow the user to place beverage containers onto the plurality of coaster pads 15 to be supported by the table top 16.

Although the invention has been explained in relation to its preferred embodiment, it is to be understood that many other possible modifications and variations can be made without departing from the spirit and scope of the invention as hereinafter claimed.

What is claimed is:

1. A hookah table comprises:
   a table;
   at least one hookah apparatus;
   a control panel;
   a central processing unit (CPU);
   at least one heating element;
   the table comprises a table top and a table base;
   the table top being adjacently connected to the table base;
   the at least one hookah apparatus being mounted to the table base;
   the control panel being externally integrated into the table top, opposite to the table base;
   the CPU being internally mounted to the table top;

the control panel being electronically connected to the CPU;

the at least one heating element being selectively mounted to a corresponding hookah apparatus; and the at least one heating element being electrically connected to the CPU.

2. The hookah apparatus, as claimed in claim 1, comprises:

each hookah apparatus of the at least one hookah apparatus comprises a substance support, a water reservoir, a smoke-receiving stem, and an at least one hookah hose;

the water reservoir being mounted onto the table base;

the substance support being adjacently connected to the water reservoir;

the substance support being positioned adjacent to the table top;

the smoke-receiving stem being in fluid communication with the substance support;

the smoke-receiving stem being positioned within the water reservoir; and the at least one hookah hose being adjacently and externally connected to the water reservoir.

3. The hookah apparatus, as claimed in claim 2, comprises each hookah hose of the at least one hookah hose comprises a smoke conduit, a hose handle, and a mouthpiece;

the smoke conduit being adjacently and externally connected to the water reservoir;

the hose handle being adjacently connected around the smoke conduit;

the mouthpiece being terminally connected to the smoke conduit, opposite to the water reservoir;

the hose handle being adjacently positioned to the mouthpiece; and the mouthpiece being in fluid communication with the water reservoir through the smoke conduit.

4. The hookah apparatus, as claimed in claim 3, comprises a handle controller;

the handle controller being integrated into the hose handle; and the handle controller being communicatively coupled with the CPU.

5. The hookah apparatus, as claimed in claim 2, comprises:

a plurality of hose light emitting diodes (LEDs);

the plurality of hose LEDs being integrated along each hookah hose; and the plurality of hose LEDs being electrically connected to the CPU.

6. The hookah apparatus, as claimed in claim 2, comprises:

at least one handle holster;

the at least one handle holster being adjacently connected to the table top; and the at least one handle holster being positioned opposite to the control panel about the table top.

7. The hookah apparatus, as claimed in claim 6, comprises:

each hookah hose comprises a hose handle; and each hose handle being positioned within a corresponding handle holster of the at least one handle holster.

8. The hookah apparatus, as claimed in claim 1, comprises:

a substance capsule; and the substance capsule being selectively mounted to the at least one hookah apparatus.

9. The hookah apparatus, as claimed in claim 8, comprises:

the at least one heating element being internally mounted to the substance capsule.

10. The hookah apparatus, as claimed in claim 8, comprises:

each of the at least one hookah apparatus comprises a substance support; and the substance capsule being positioned into the substance support.

11. The hookah apparatus, as claimed in claim 1, comprises:

a wireless transceiver;

the wireless transceiver being internally mounted to the table top; and the wireless transceiver being electronically connected to the CPU.

12. The hookah apparatus, as claimed in claim 1, comprises:

a plurality of panel light emitting diodes (LEDs);

the plurality of panel LEDs being integrated into the table top;

the plurality of panel LEDs being positioned around the control panel; and the plurality of panel LEDs being electrically connected to the CPU.

13. The hookah apparatus, as claimed in claim 1, comprises:

a panel cover; and the panel cover being hingedly connected to the table top, adjacent to the control panel.

14. The hookah apparatus, as claimed in claim 13, comprises:

the control panel being positioned between the panel cover and the table top.

15. The hookah apparatus, as claimed in claim 13, comprises:

a panel display device;

the panel display device being integrated into the panel cover;

the panel display device being positioned between the panel cover and the control panel; and the panel display device being electronically coupled with the CPU.

16. The hookah apparatus, as claimed in claim 1, comprises:

a panel display device;

the panel display device being externally integrated with the control panel; and the panel display device being electronically coupled with the CPU.

17. The hookah apparatus, as claimed in claim 1, comprises:

a mobile device charging port;

the mobile device charging port being externally integrated into the table top; and the mobile device charging port being electrically connected to the CPU.

18. The hookah apparatus, as claimed in claim 1, comprises:

a plurality of coaster pads;

the plurality of coaster pads being adjacently connected to the table top; and the plurality of coaster pads being oppositely positioned to the table base, about the table top.

19. The hookah apparatus, as claimed in claim 1, wherein the control panel is waterproof.

20. The hookah apparatus, as claimed in claim 1, wherein the control panel is a touchscreen display device.

\* \* \* \* \*